United States Patent [19]

Etter et al.

[11] Patent Number: 4,582,492

[45] Date of Patent: Apr. 15, 1986

[54] METHOD FOR BEHAVIOR MODIFICATION USING OLFACTORY STIMULI

[75] Inventors: Robert M. Etter; Phillip J. Neumiller, both of Racine County, Wis.

[73] Assignee: S. C. Johnson & Son, Inc., Racine, Wis.

[21] Appl. No.: 702,718

[22] Filed: Feb. 19, 1985

[51] Int. Cl.⁴ .............................................. G09B 19/00
[52] U.S. Cl. .................................... 434/236; 131/270; 252/522 A; 428/905
[58] Field of Search .................. 131/270; 252/522 A; 428/905; 434/236, 333, 346, 428, 433

[56] References Cited

U.S. PATENT DOCUMENTS

| | | | |
|---|---|---|---|
| 3,570,139 | 3/1971 | Ladd | 434/346 |
| 3,729,569 | 4/1973 | Charle | 252/522 A X |
| 3,886,953 | 6/1975 | Pope | 131/270 |
| 3,889,163 | 6/1975 | Symmes | 131/270 X |
| 4,246,913 | 1/1981 | Ogden | 434/236 X |
| 4,283,011 | 8/1981 | Spector | 428/905 X |

*Primary Examiner*—Harland S. Skogquist

[57] ABSTRACT

A method for behavior modification using olfactory stimuli. The method comprises microencapsulating different smelling odors into a patch such that at least one odor is dominant and at least one odor is subservient, placing the patch on a hand associated with the behavior to be modified, scratching the patch when the urge to engage in the behavior to be modified occurs, thereby temporarily releasing the subservient odor, smelling the patch with the released subservient odor to act as a stimulus to effect behavior modification, and smelling the patch after the urge to engage in the behavior to be modified passes thereby reinforcing the behavior modification with the dominant odor.

14 Claims, No Drawings

METHOD FOR BEHAVIOR MODIFICATION USING OLFACTORY STIMULI

BACKGROUND OF THE INVENTION

1. Field of the Invention

The present invention is concerned with a method of behavior modification using olfactory stimuli. The behavior modification includes behavior avoidance, behavior addition, and behavior substitution. The olfactory stimuli may be negative response stimuli, positive response stimuli, or positive, negative response stimuli.

This invention is further concerned with the use of microencapsulated odors which act as a negative stimulus to modify behavior such as overeating, smoking, or other unwanted behaviors.

2. Description of the Prior Art

The use and preparation of various aromas to enhance the flavoring of food is well known in the prior art.

Rusoff U.S. Pat. No. 2,954,293 relates to cacao products and a process for producing a water-soluble flavor concentrate having full-bodied chocolate flavor and aroma. This flavoring material is produced by extracting unroasted fermented cacao beans and other similar cacao material with a mixture of one or more organic solvents and water. The solvent mixture serves to remove materials not readily extractable with water including certain alkaloids such as caffeine as well as tannins and anthocyanins. Thus, water serves to extract water-soluble chocolate flavor and aroma precursors.

Rusoff differs from the present invention in that Rusoff is concerned with enhancing the flavor of foods and beverages which utilize chocolate and chocolate extracts. Such is not the case in the present invention wherein various aromas are used as behavior modification means and particularly as an appetite suppressant by creating an adverse smell when the urge to eat occurs. Thus, the present invention differs from Rusoff.

Nonaka U.S. Pat. No 3,669,690 relates to a process for recovering the volatile flavor essences from meat and meat products, for example animal flesh, organs, skin, fat, broths, drippings from meat roasting operations, and including such materials derived from poultry. The volatile flavor principals of these materials are recovered by extraction or entrapment using di-n-butyl phthalate (DNBP). The DNBP has the unique property of capturing the meaty essence while at the same time not dissolving undesirable components such as water, carbohydrates, proteins, amino acids, organic salts, etc.

Nonaka differs from the present invention in that the present invention is concerned with an appetite suppressant odor created by microencapsulated organic solvents which mimic various aromas. These are not added to a food material, but rather are used as behavior modification stimuli whenever the urge to engage in a habit which is desired to be broken occurs. Thus, the present invention differs from Nonaka Schreiber et al. U.S. Pat. No. 4,031,140 relates to a 4,5 phenyl pentenal lower alkyl or lower alkylene acetals which are used to alter the flavor and/or aroma of consumable materials. It is felt that by the use of these materials, there will be a correspondingly diminishing use requirement of natural materials which may be in short supply which are used to flavor foods and other consumables.

Schreiber et al. differs from the present invention in that the present invention is not concerned with the flavoring of foods. Rather, the present invention is concerned with the behavior modification whereby an adverse stimulus is provided in the form of an olfactory stimulus whenever the urge to undertake behavior which is sought to be modified occurs. Thus, the present invention differs from Schreiber et al.

Yano et al. U.S. Pat. No. 4,069,351 relates to an extraction method whereby hydrophilic and lipophilic flavor and odor producing components of natural products are extracted with dimethyl ether and water mixtures. These extracted odorants and flavors would then be added to less "palatable" food stuff in order to enhance the flavor and so marketability of the food stuff.

Yano differs from the present invention in that the present invention utilizes a microencapsulated odor which serves as a behavior modification means to alter and eliminate habits of the user. Accordingly, the present invention differs from Yano.

SUMMARY OF THE INVENTION

The present invention relates to a method for behavior modification using olfactory stimuli. The method entails microencapsulation of different odors into a patch or pad. The patch has at least one odor and preferrably only one which is dominant, i.e. is smelled most of the time. A subservient odor is provided which is only temporary in duration, that is when released, its odor lasts for a short time i.e. long enough to modify the behavior sought to be modified, and then fades away to reveal the dominant odor once again. The odors are usually organic solvent products of natural and synthetic aroma chemicals and the like which are well know in the art. These microencapsulated odors are placed on a patch which is then placed on the hand associated with the behavior to be modified, such as over-eating, excessive drinking or smoking. Whenever the urge to engage in the behavior to be modified is felt, the user scratches the patch on the hand and releases the subservient odor. This odor is then smelled and acts as an olfactory stimulus to effect the behavior modification desired. After a short period of time has passed, the subservient odor fades and the dominant odor is then detectable, thereby re-enforcing the behavior modification. The behavior modification includes behavior addition, behavior avoidance, and behavior substitution. The dominant odor is preferrably pleasant smelling whereas the subservient odor is preferrably very foul or fetid. In this manner it is felt that the dominant odor will not offend the user while wearing the patch and will act as a re-enforcer after the subservient odor has subsided. By virtue of its offensive odor, the subservient odor acts as the negative stimulus to effect the behavior modification.

DETAILED DESCRIPTION OF THE PREFERRED EMBODIMENT

Behavior modification as used herein is used to describe behavior addition, behavior substitution, and behavior avoidance with both negative stimuli, positive stimuli and positive/negative stimuli.

It is an object of the invention to modify negative habits associated with the hand such as smoking, excessive drinking or over-eating by providing an olfactory stimulus associated with the act such that avoidance or modification of behavior is achieved.

Most negative habits such as smoking, over-eating and excessive drinking are associated with the hand and mouth. In each of these acts, the user feels an urge to partake in some activity which has become habit forming. The subject then unconsciously undertakes these habits for lack of anything better to do. Many times the complaint is heard that overeating and smoking are undertaken on impulse such as under an urge or some stress. It is therefore useful to modify the subject's behavior so that in response to urges or stresses, they will not undertake such destructive habits and modify his behavior so that such destructive habits are avoided or completely eliminated. It has been seen as advantageous that a subject may modify his own behavior by associating a destructive habit with some unpleasant or distasteful experience such that the association in the mind becomes fixed and the subject will lose all urgings to undertake the destructive habit sought to be modified.

The present invention offers one such solution. The present invention is concerned with an olfactory stimulus which serves to modify the behavior of the subject. The olfactory stimuli are in the form of microencapsulated chemical odorants which are placed in a convenient form such as a patch or other means and placed on the hand associated with the habit to be modified. Preferably, the microencapsulated odors are two types, namely a dominant pleasant smelling odor and a subservient foul or fetid smelling odor. The dominant odor is to be prevalent when the user opens the package and puts the patch on his hand. This odor is such that it is usually a pleasant odor and may act as a reinforcer to the subject during times of stress. Particularly, when the urge to undertake the habit is felt, the user may smell the dominant odor and be reminded that he does not want to undertake such habits, thereby resisting the urge.

However, when the urge becomes so strong that the user is not able to resist, the subservient odor comes into play. Specifically, the user would then scratch the patch on his hand and break some of the microencapsulated adverse subservient odor particles. He would then smell the patch and detect the aversive foul or fetid or nauseous smell emanating from the ruptured microencapsulated odor particles and associate that smell with the habit or the urge to undertake the habit. It is felt that when this occurs often enough, the urge will become associated in the subject's mind with this foul odor. Thus, the therapy may be discontinued when the association between the habit and the foul, fetid or nauseous odor becomes fixed in the subject's mind. It is felt that the subject will automatically abstain from the habit which was modified by use of the microencapsulated particles.

The patch may also be provided with a dominant smell and a subservient smell which then fades away to give place to the dominant smell once again. It is felt that in this manner, when the urge to undertake the habit to be modified is felt, the subservient odor is released by scratching and rupturing the microencapsulated odor particles which then, after a short period of time, fades and the dominant odor, which is usually pleasant smelling, becomes detectable by the subject. This pleasant smell acts to reinforce avoidance of the habit to be modified. This is a well known principle in classical behavior modification and it is felt that this pleasant smell will be attractive enough to the subject to be associated with the reward for avoiding the unwanted habit. Thus, it can be seen that the present invention relates to a method for behavior modification which involves a dominant pleasant smelling odor carried on a patch or similar device placed on the hand associated with the habit to be modified. Whenever the urge to undertake the behavior becomes strong, the pad is scratched thereby releasing the microencapsulated unpleasant subservient odor. The smell is detected by the subject who then associates the urge to undertake these bad habits with this foul odor. After a while the foul odor fades and the pleasant dominant odor returns which acts as a reinforcer to the subject for avoiding the habit to be modified.

The aversive or unpleasant subservient odors may consist of natural and synthetic aroma chemicals and the like, and particularly any of the following organic solvent products; Thione 220 SB-02-0333 IFF LB gas odorant; 2-phenylethyl mercaptan; Mangone 130456 IFF; Triethylamine; Phenyl acetic acid; IFF 2025-1503 i.e., "vomit smell"; N-Butyric acid; diethyldithiocarbanic acid and its sodium salt; Skatole 3-methylindole; Methyl disulfide ($CH_3$-S-S-$CH_3$) and Indol 2,3-Benzopyriole. The solvent for all of these is diethylphtholate, which contains no odor, and the like.

The pleasant smelling odors or dominant odors are organic solvent products (i.e. natural and synthetic aroma chemicals and the like) and may be selected from a list consisting of; Felton #715 R18634; Felton #955 R24519; Florasynth 1A-78-1623; Felton #385 R18634; Felton #695 R18634; Roure Bertrand Dupont, Inc. M-482; Florasynth K-2187 and the like. Once again, the solvent for all of these is diethylphthalate which contains no odor. The pleasant odors must be applicable to the habit, age and socio-economic background of the subject providing optimal hedonics.

Finally, it should be noted that the dominant smell should be selected to be specific to the age, sex, behavior to be modified and socio-economic background of the subject, and that men and women are attracted to different odors.

Both the dominant and subservient odors are microencapsulated onto disks which are placed on the hand and then sniffed. When the urge becomes so strong that the subject feels he is losing control, the disks are scratched thereby releasing the subservient or foul odor. The foul odor acts as a negative stimulus to be associated with the urgings for the habit. After a period of time, the subservient odor fades and the dominant pleasant odor becomes pervasive once again and the subject is rewarded for modifing his behavior and avoiding the bad habit.

Although it is disclosed to use the olfactory stimuli in a manner described above, the applicant does not wish to be limited by the particular details as enumerated above but it will be understood by all those skilled in the art that any olfactory stimulus which serves to effect behavior modification is envisioned in the scope and spirit of this invention.

We claim:

1. A method for behavior modification using olfactory stimuli, said method comprising:
    (a) Microencapsulating different smelling odors into a patch such that at least one odor is dominant and at least one odor is subservient;
    (b) Placing said patch on a hand associated with the behavior to be modified;
    (c) Scratching said pad when the urge to engage in the behavior to be modified occurs, thereby temporarily releasing said subservient odor;

(d) Smelling said patch with the released subservient odor to act as a stimulus to effect behavior modification, and;

(e) Smelling said patch after the urge to engage in the behavior to be modified passes, thereby reinforcing the behavior modification with said dominant odor.

2. The method of claim 1, wherein there is one dominant odor and one subservient odor.

3. The method of claim 1, wherein said dominant odor is pleasant smelling and said subservient odor is adverse smelling.

4. The method of claim 1, wherein said behavior modification is behavior avoidance.

5. The method of claim 1, wherein said behavior modification is behavior addition.

6. The method of claim 1, wherein said behavior modification is behavior substitution.

7. The method of claim 1, wherein said stimulus is a positive response stimulus.

8. The method of claim 1, wherein said stimulus is a negative response stimulus.

9. The method of claim 1, wherein said stimulus is a positive, negative, positive response stimulus.

10. The method of claim 1, wherein said dominant odors are organic solvent products selected from the group consisting of natural and synthetic aroma chemicals and the like.

11. The method of claim 1, wherein said subservient odors are organic solvent products selected from the group consisting of natural and synthetic aroma chemicals and the like.

12. The method of claim 1, wherein said dominant odor is attractive to women.

13. The method of claim 1, wherein said dominant odor is attractive to men.

14. The method of claim 1, wherein said dominant odor is selected to be specific to the sex, age, behavior to be modified and socio-economic background of the subject to provide optimal hedonics.

* * * * *